(12) United States Patent
Hirose

(10) Patent No.: US 9,782,747 B2
(45) Date of Patent: Oct. 10, 2017

(54) OXYGEN-ABSORBING RESIN COMPOSITION

(71) Applicant: Kuraray Co., Ltd., Kurashiki-shi (JP)

(72) Inventor: Wataru Hirose, Kurashiki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 0 days.

(21) Appl. No.: 15/324,308

(22) PCT Filed: Jul. 13, 2015

(86) PCT No.: PCT/JP2015/069980
§ 371 (c)(1),
(2) Date: Jan. 6, 2017

(87) PCT Pub. No.: WO2016/009975
PCT Pub. Date: Jan. 21, 2016

(65) Prior Publication Data
US 2017/0203278 A1    Jul. 20, 2017

(30) Foreign Application Priority Data

Jul. 15, 2014   (JP) .................. 2014-144751

(51) Int. Cl.
*B01J 20/26* (2006.01)
*C08L 29/04* (2006.01)

(52) U.S. Cl.
CPC ............. *B01J 20/261* (2013.01); *C08L 29/04* (2013.01); *C08L 2201/14* (2013.01)

(58) Field of Classification Search
CPC ........... B01J 20/26; B01J 20/261; C08L 29/04
USPC ....................................... 502/402
See application file for complete search history.

(56) References Cited

U.S. PATENT DOCUMENTS

| | | |
|---|---|---|
| 2005/0090622 A1 | 4/2005 | Kitano et al. |
| 2009/0048397 A1 | 2/2009 | Kitahara et al. |
| 2009/0169902 A1 | 7/2009 | Inubushi et al. |
| 2010/0051861 A1 | 3/2010 | Inubushi et al. |
| 2015/0284520 A1 | 10/2015 | Ozawa et al. |

FOREIGN PATENT DOCUMENTS

| | | |
|---|---|---|
| JP | 2001-40226 A | 2/2001 |
| JP | 2003-292531 A | 10/2003 |
| JP | 2007-119607 A | 5/2007 |
| JP | 2009-279787 A | 12/2009 |
| WO | 2004/018564 A1 | 3/2004 |
| WO | WO 2007/126157 A1 | 11/2007 |
| WO | 2008/032743 A1 | 3/2008 |
| WO | 2014/073215 A1 | 5/2014 |

OTHER PUBLICATIONS

International Search Report issued Sep. 1, 2015 in PCT/JP2015/069980 filed Jul. 13, 2015.
M.J. Abadie, et al., "New Catalysts for Linear Polydicyclopentadiene Synthesis" European Polymer Journal, vol. 36, 2000, pp. 1213-1219.

*Primary Examiner* — Edward Johnson
(74) *Attorney, Agent, or Firm* — Oblon, McClelland, Maier & Neustadt, L.L.P.

(57) ABSTRACT

An oxygen-absorbing composition of the present invention contains: a gas barrier resin (A) having an oxygen transmission rate of 500 mL·20 μm/(m²·day·atm) or less as measured at 20° C. and 65% RH; a thermoplastic resin (B) including repeating units represented by General Formula (I) below

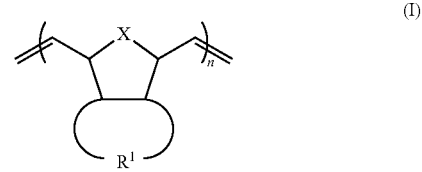

(where X is a methylene group or an oxygen atom, $R^1$ is an alkenylene group having 3 to 12 carbon atoms, and n is an integer of 5 to 5000); at least one type of metal salt (C) selected from the group consisting of an iron salt, a nickel salt, a copper salt, a manganese salt, and a cobalt salt; and a bifunctional processing stabilizer (D) that is a compound having an acrylate structure and a hindered phenol structure in a same molecule. The oxygen-absorbing resin composition of the present invention performs excellent oxygen-absorbing properties, and enables to reduce generation of an unpleasant odor caused by decomposition of the oxygen-absorbing composition during oxygen absorption.

12 Claims, No Drawings

OXYGEN-ABSORBING RESIN COMPOSITION

TECHNICAL FIELD

The present invention relates to an oxygen-absorbing resin composition having excellent oxygen-absorbing properties, a multilayer structure including a layer made of the resin composition, and a molded product made of the multilayer structure.

BACKGROUND ART

Gas barrier resins, for example, ethylene-vinyl alcohol copolymers (hereinafter, also abbreviated as EVOH) are materials having excellent oxygen barrier properties. Such resins can be melt-molded, and thus they are preferably used as a multilayer packaging material comprising a layer of such a resin laminated with a layer made of a thermoplastic resin (polyolefin, polyester, etc.) having excellent moisture resistance, excellent mechanical properties, and the like. However, the gas transmission of these gas barrier resins is not completely zero, and they transmit a non-negligible amount of gas. In order to reduce such transmission of gas, especially oxygen, which significantly affects the quality of a content of a packaged product, in particular the quality of food, or in order to absorb and remove oxygen that is already present inside a packaged product at the time of packaging its content, it is known to use an oxygen absorbent in a state of being mixed in a packaging material.

Compositions containing a thermoplastic resin having an unsaturated hydrocarbon, and a transition metal catalyst have been proposed as ingredients suitable for oxygen absorption.

For example, Patent Document 1 has disclosed an oxygen-absorbing resin composition using polyoctenylene as the thermoplastic resin. Such polyoctenylene is produced through ring-opening metathesis polymerization of cyclic olefin using a transition metal carbene complex catalyst such as a ruthenium compound. However, it is pointed out that, when used as a packaging material, such an oxygen-absorbing resin composition is decomposed and may generate an unpleasant odor as oxygen absorption proceeds. Therefore, there are demands for a further odor improvement for applications in which odorless packing is highly required.

Furthermore, Patent Document 2 has disclosed an oxygen-absorbing resin composition using polynorbornene as the thermoplastic resin. Such a thermoplastic resin is produced, for example, through ring-opening metathesis polymerization of norbornene using a ruthenium compound. However, it is pointed out that such an oxygen-absorbing resin composition is also decomposed and may generate an unpleasant odor as oxygen absorption. Therefore, there are demands for a development of an oxygen-absorbing resin composition that has excellent oxygen-absorbing properties, and enables further reduction of an unpleasant odor resulting from oxygen absorption.

Moreover, Non-Patent Document 1 has disclosed that poly(bicyclo[3.3.0]octa-2-en-6,8-diylidene) (hereinafter, also abbreviated as poly(dicyclopentadiene) or PDCPD) can be produced through ring-opening metathesis polymerization of dicyclopentadiene using a tungsten compound. However, it is not stated, for example, whether or not this material has oxygen-absorbing properties, whether or not this material is decomposed and generates an unpleasant odor as oxygen absorption proceeds, or the like.

CITATION LIST

Patent Documents

Patent Document 1: WO 2007/126157
Patent Document 2: WO 2008/032743

Non-Patent Documents

Non-Patent Document 1: European Polymer Journal, Vol. 36, 2000, pp 1213-19

SUMMARY OF INVENTION

Problem to be Solved by Invention

The present invention solves the above-described problem, and an object thereof is to provide an oxygen-absorbing composition that has excellent oxygen-absorbing properties and enables to reduce of an unpleasant odor caused by decomposition of the oxygen-absorbing composition during oxygen absorption.

Means for Solving the Problem

The present invention provides an oxygen-absorbing resin composition, comprising:

a gas barrier resin (A) having an oxygen transmission rate of 500 mL·20 μm/(m²·day·atm) or less as measured at 20° C. and 65% RH;

a thermoplastic resin (B) including repeating units represented by the following general Formula (I):

[Chemical 1]

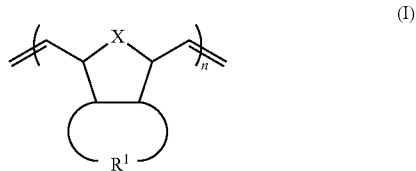

(where X is a methylene group or an oxygen atom, $R^1$ is an alkenylene group having 3 to 12 carbon atoms, and n is an integer of 5 to 5000);

at least one type of metal salt (C) selected from the group consisting of an iron salt, a nickel salt, a copper salt, a manganese salt, and a cobalt salt; and a bifunctional processing stabilizer (D) that is a compound having an acrylate structure and a hindered phenol structure in a same molecule.

In one embodiment, the thermoplastic resin (B) includes repeating units represented by the following general formula (II):

[Chemical 2]

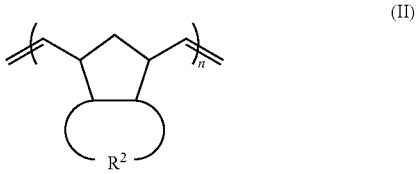

(where $R^2$ is an alkenylene group having 3 to 9 carbon atoms, and n is an integer of 5 to 5000).

In one embodiment, the thermoplastic resin (B) includes repeating units represented by the following general formula (III):

[Chemical 3]

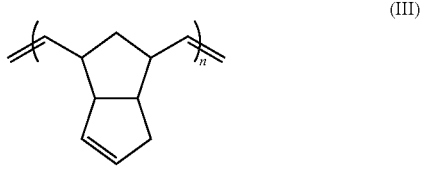

(III)

(where n is an integer of 10 to 5000).

In a further embodiment, the thermoplastic resin (B) is a resin that is obtained through ring-opening metathesis polymerization of dicyclopentadiene in the presence of a tungsten compound.

In one embodiment, the bifunctional processing stabilizer (D) is contained in a ratio of 500 to 20000 ppm based on the mass of the thermoplastic resin (B).

In one embodiment, the content of the gas barrier resin (A) is 70 to 99% by mass, and the content of the thermoplastic resin (B) is 30 to 1% by mass, based on the total mass of the gas barrier resin (A) and the thermoplastic resin (B).

In one embodiment, the metal salt (C) is contained in a ratio of 50 to 1000 ppm in terms of metal atoms based on the total mass of the gas barrier resin (A) and the thermoplastic resin (B).

In one embodiment, the gas barrier resin (A) is an ethylene-vinyl alcohol copolymer at least having an ethylene unit content of 5 to 60 mol %, and having a saponification degree of 90 mol % or more.

In one embodiment, the oxygen-absorbing resin composition of the present invention further includes a phenolic primary antioxidant (E).

In a further embodiment, the oxygen-absorbing resin composition of the present invention includes the phenolic primary antioxidant (E) in a ratio of 50 to 2000 ppm based on the mass of the thermoplastic resin (B).

The present invention also provides a multilayer structure having a layer made of the above oxygen-absorbing resin composition.

The present invention also provides a molded product made of a multilayer structure having a layer made of the above oxygen-absorbing resin composition.

Advantageous Effects of Invention

According to the present invention, it is possible to provide excellent oxygen-absorbing properties, and to reduce generation of an unpleasant odor caused by decomposition during oxygen absorption. Furthermore, in the present invention, even when using PDCPD as the thermoplastic resin (B), a pelletizing process becomes easy, and the processability of a molded product with the obtained resin can be improved. Accordingly, it is possible to provide, for example, a container such as a multilayer film or a multilayer container suitable for storage of oxygen sensitive food products.

DESCRIPTION OF EMBODIMENTS

Hereinafter, the present invention will be described in detail.

The oxygen-absorbing resin composition of the present invention contains a gas barrier resin (A), a thermoplastic resin (B), a metal salt (C), and a bifunctional processing stabilizer (D).

(Gas Barrier Resin (A))

The gas barrier resin (A) constituting the composition of the present invention is a resin having gas barrier properties in which the oxygen transmission rate is 500 mL·20 µm/(m²·day·atm) or less as measured at 20° C. and a relative humidity (RH) of 65%. The term "oxygen transmission rate" used herein refers to the volume of oxygen transmitted through a film having an area of 1 m² and a thickness of 20 µm per day under a differential pressure of oxygen of 1 atm. In the case of using a resin having an oxygen transmission rate of more than 500 mL·20 µm/(m²·day·atm), the gas barrier properties of the obtained oxygen-absorbing resin composition may be insufficient.

The gas barrier resin (A) in the present invention has an oxygen transmission rate of preferably 100 mL·20 µm/(m²·day·atm) or less, more preferably 20 µmL·20 µm/(m²·day·atm) or less, and even more preferably 5 mL·20 µm/(m²·day·atm) or less. If this gas barrier resin (A) is mixed with the thermoplastic resin (B), the metal salt (C), and the bifunctional processing stabilizer (D), which will be described later, superior oxygen-absorbing properties are obtained in addition to the gas barrier properties, so that an oxygen-absorbing resin composition having high gas barrier properties can be obtained.

Examples of the gas barrier resin (A) include, but not necessarily limited to, a polyvinyl alcohol-based resin (A-i), a polyamide resin (A-ii), a polyvinyl chloride resin (A-iii), and a polyacrylonitrile resin (A-iv), and combinations thereof.

Among the gas barrier resins (A), the polyvinyl alcohol-based resin (A-i) may be a resin obtained by saponifying a homopolymer of vinyl ester or a copolymer of vinyl ester and another monomer (e.g., a copolymer of vinyl ester and ethylene) using an alkali catalyst or the like. Examples of the vinyl ester include fatty acid vinyl esters such as vinyl acetate, vinyl propionate, vinyl pivalate, and the like.

The vinyl ester component of the polyvinyl alcohol-based resin (A-i) has a saponification degree of preferably 90 mol % or more. If the vinyl ester component of the polyvinyl alcohol-based resin (A-i) has a saponification degree of less than 90 mol %, the gas barrier properties of the gas barrier resin and the composition of the present invention may be worse at high humidity. Especially in the case where the polyvinyl alcohol-based resin (A-i) is an ethylene-vinyl alcohol copolymer (hereinafter, referred to as EVOH), if the saponification degree is less than 90 mol %, the thermal stability may be insufficient, and the molded product tends to contain gels or aggregates.

In the present invention, EVOH is preferably used as the gas barrier resin (A), because it can be melt-molded and has good gas barrier properties at high humidity.

Furthermore, in the present invention, the ethylene unit content in the EVOH is preferably 5 to 60 mol %. If the ethylene unit content in the EVOH is less than 5 mol %, the gas barrier properties of the oxygen-absorbing resin composition may be worse at high humidity, and the processability in molding process may be sacrificed. On the other hand, if the ethylene unit content in the EVOH is more than 60 mol %, the oxygen-absorbing resin composition may not be provided with sufficient gas barrier properties. The ethylene unit content and the saponification degree of the EVOH may be evaluated, for example, by nuclear magnetic resonance (NMR).

The EVOH may contain a small amount of monomer units other than ethylene units and vinyl alcohol units, as copolymer units, within a range not inhibiting the objects of the present invention. Examples of such monomers include: α-olefins such as propylene, 1-butene, isobutene, 4-methyl-1-pentene, 1-hexene, and 1-octene; unsaturated carboxylic acids such as itaconic acid, methacrylic acid, acrylic acid, and maleic anhydride, and salts, partial and complete esters, nitriles, amides, and anhydrides thereof; vinylsilane compounds such as vinyltrimethoxysilane, vinyltriethoxysilane, and vinyltri(β-methoxyethoxy)silane; unsaturated sulfonic acids and salts thereof; alkylthiols; and vinylpyrrolidones.

The EVOH may contain 0.0002 to 0.2 mol % of vinylsilane compound as the copolymer component. Furthermore, the EVOH may contain a boron compound, and the content of the boron compound is preferably 20 to 2000 ppm in terms of boron. Furthermore, the EVOH may contain an alkali metal salt, and the content of alkali metal salt is preferably 5 to 5000 ppm in terms of alkali metal. Furthermore, the EVOH may contain a phosphoric acid compound, and the content of phosphoric acid compound is preferably 20 to 500 ppm in terms of phosphoric acid radical.

The EVOH has a melt flow rate (MFR) (210° C., 2160 g load, as defined in JIS K7210) of preferably 0.1 to 100 g/10 min.

Among the gas barrier resins (A), there is no particular limitation on the type of the polyamide resin (A-ii). Examples of a polyamide that can be used as the gas barrier resin (A) include: aliphatic polyamide homopolymers such as polycaprolactam (Nylon 6), polyundecanamide (Nylon 11), polylaurolactam (Nylon 12), polyhexamethylene adipamide (Nylon 6,6), and polyhexamethylene sebacamide (Nylon 6,10); aliphatic polyamide copolymers such as a caprolactam/laurolactam copolymer (Nylon 6/12), a caprolactam/aminoundecanoic acid copolymer (Nylon 6/11), a caprolactam/ω-aminononanoic acid copolymer (Nylon 6/9), a caprolactam/hexamethylene adipamide copolymer (Nylon 6/6,6), and a caprolactam/hexamethylene adipamide/hexamethylene sebacamide copolymer (Nylon 6/6,6/6,10); and aromatic polyamides such as polymetaxylylene adipamide (MX-Nylon) and a hexamethylene terephthalamide/hexamethylene isophthalamide copolymer (Nylon 6T/6I), and combinations thereof. Polycaprolactam (Nylon 6), polyhexamethylene adipamide (Nylon 6,6), and polymetaxylylene adipamide (MX-Nylon) are preferable because they can provide the obtained composition with good gas barrier properties.

Examples of the polyvinyl chloride resin (A-iii) include homopolymers such as vinyl chloride homopolymer and vinylidene chloride homopolymer, copolymers containing vinyl chloride or vinylidene chloride and further containing vinyl acetate, a maleic acid derivative, a higher alkyl vinyl ether, or the like, and combinations thereof.

Examples of the polyacrylonitrile resin (A-iv) include an acrylonitrile homopolymer, and a copolymer of acrylonitrile and acrylic acid ester or the like.

(Thermoplastic Resin (B))

The thermoplastic resin (B) constituting the composition of the present invention includes repeating units represented by the following general formula (I):

[Chemical 4]

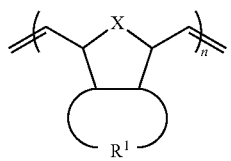

Where, in the formula (I),

X is a methylene group or an oxygen atom, and preferably a methylene group;

$R^1$ is an alkenylene group having 3 to 12 carbon atoms, preferably an alkenylene group having 3 to 9 carbon atoms, and more preferably an alkenylene group having 3 to 6 carbon atoms; and n is an integer of 5 to 5000, preferably 10 to 5000, more preferably 100 to 4000, even more preferably 150 to 3000, and particularly preferably 200 to 2500.

Examples of the alkenylene group having 3 to 12 carbon atoms represented by $R^1$ include unsubstituted alkenylene groups having 3 to 12 carbon atoms, and alkenylene groups having 3 to 11 carbon atoms substituted with an alkyl group having 1 to 3 carbon atoms. Examples of the unsubstituted alkenylene groups having 3 to 12 carbon atoms include a propenylene group, a butenylene group, a pentenylene group, a hexenylene group, a heptenylene group, an octenylene group, a nonenylene group, a decenylene group, an undecenylene group, and a dodecenylene group.

In the composition of the present invention, the thermoplastic resin (B) including the formula (I) above preferably includes repeating units represented by the following general formula (II):

[Chemical 5]

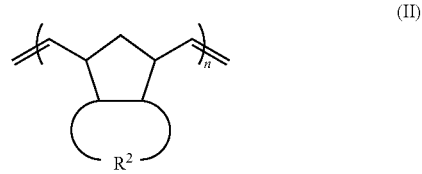

(where $R^2$ is an alkenylene group having 3 to 9 carbon atoms, and n is an integer of 5 to 5000). Examples of the alkenylene group having 3 to 9 carbon atoms represented by $R^2$ include alkenylene groups having 3 to 9 carbon atoms included in the above-mentioned alkenylene group having 3 to 12 carbon atoms.

The thermoplastic resin (B) more preferably includes repeating units represented by the following general formula (III):

[Chemical 6]

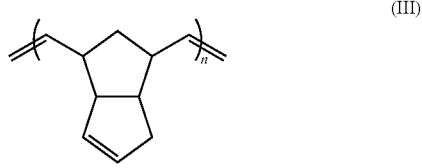

(where n is an integer of 10 to 5000).

The thermoplastic resin (B) has carbon-carbon double bonds in the included repeating units. Accordingly, it can efficiently react with oxygen, and thus is provided with oxygen-absorbing properties. The term "carbon-carbon double bonds in the included repeating units" used herein refers to "carbon-carbon double bonds" included in a portion constituting the main chain, among the repeating units represented by the general formula (I) above included in the thermoplastic resin (B), and the "carbon-carbon double bonds" do not include carbon-carbon double bonds in an aromatic ring.

The carbon-carbon double bonds in the repeating units included in the thermoplastic resin (B) have a total amount of preferably 0.001 to 0.020 mol/g, more preferably 0.003 to 0.019 mol/g, and even more preferably 0.005 to 0.018 mol/g. If the total amount is less than 0.001 mol/g, the oxygen-absorbing properties of the obtained oxygen-absorbing resin composition may be insufficient. If the total amount is more than 0.020 mol/g, a molded product obtained by molding an oxygen-absorbing resin composition containing this thermoplastic resin, together with other resins, may be colored or contain aggregates.

In the present invention, since the repeating units included in the thermoplastic resin (B) satisfy the general formula (I) above, not only is there a double bond in the main chain, but also a ring constituting the main chain is bicyclic and there is a double bond also in a ring portion not constituting the main chain. In the repeating units, a double bond in a ring portion not constituting the main chain has a reactivity that is higher than that of a double bond constituting the main chain, and thus an increase in the oxygen absorption rate at room temperature at the ring portion can be expected. Accordingly, before the double bond in the main chain portion absorbs oxygen, the double bond in the ring portion not constituting the main chain preferentially absorbs oxygen, and oxygen absorption by the double bond in the main chain portion can be delayed to all extent possible. Accordingly, a cleavage of the main chain hardly occurs, and new generation of odor components due to the cleavage can be suppressed. Furthermore, even when the cleavage of the main chain occurs, molecules generated by the cleavage have a large molecular weight and thus their volatility is low, as a result of which odor can be suppressed.

Moreover, with the cyclic repeating units represented by the formula (I), the oxygen-absorbing resin composition containing the thermoplastic resin (B) can attain an excellent initial oxygen absorption rate and superior transparency.

In the present invention, the thermoplastic resin (B) has a weight-average molecular weight (Mw) of preferably 10000 to 250000, and more preferably 40000 to 200000. If the thermoplastic resin (B) has a weight-average molecular weight (Mw) of less than 10000 or more than 500000, the processability in molding process and handling ability of the obtained oxygen-absorbing resin composition may be poor, and when processed into a molded product, mechanical properties such as rigidity and stretchability may be poor. Furthermore, when mixed with the gas barrier resin (A), the dispersibility of the thermoplastic resin (B) becomes worse, and, as a result, the oxygen-absorbing properties may be sacrificed, and the properties (e.g., gas barrier properties) of the gas barrier resin (A) may not be sufficient.

In the present invention, the content of the thermoplastic resin (B) may be set as follows based on the relationship with the gas barrier resin (A). That is to say, based on the total mass (100% by mass) of the gas barrier resin (A) and the thermoplastic resin (B), the ratio (mass ratio) between the contents of the gas barrier resin (A) and the thermoplastic resin (B) is preferably 99/1 to 70/30% by mass, and more preferably 98/2 to 80/20% by mass. If the mass ratio between the contents of the gas barrier resin (A) and the thermoplastic resin (B) is higher than 99/1, the oxygen-absorbing properties of the obtained resin composition may be insufficient. If the mass ratio between the contents of the gas barrier resin (A) and the thermoplastic resin (B) is lower than 70/30, the appearance of the obtained resin composition may be poor.

The thermoplastic resin (B) can, but no particular limited to, for example, be produced through ring-opening metathesis polymerization of cyclic organic compounds. In the ring-opening metathesis polymerization, tungsten compounds well known in the polymerization may be used as a ring-opening metathesis polymerization catalyst (x). More specifically, for example, the thermoplastic resin including the repeating units represented by the formula (III) above can be obtained through ring-opening metathesis polymerization of dicyclopentadiene in the presence of a tungsten compound.

Examples of the ring-opening metathesis polymerization catalyst (x) that can be used in the ring-opening metathesis polymerization include a catalyst (x-1) containing a transition metal halide as a main ingredient, a transition metal carbene complex catalyst (x-2), and the like. The catalyst (x-1) containing a transition metal halide as a main ingredient is a catalyst mainly containing a transition metal halide and containing a cocatalyst.

The transition metal halide contained in the catalyst (x-1) mainly containing a transition metal halide is preferably a tungsten (W) halide. Examples of the tungsten halide include $WBr_2$, $WCl_2$, $WBr_4$, $WCl_4$, $WCl_5$, $WCl_6$, $WF_4$, $WI_2$, $WOBr_4$, $WOCl_4$, $WOF_4$, and $WCl_4(OC_6H_4Cl_2)_2$, and combinations thereof.

Moreover, specific examples of the cocatalyst include allylsilane compounds such as tetraallylsilane and diallyldimethylsilane.

The transition metal carbene complex catalyst (x-2) is preferably a tungsten carbene complex catalyst. Specific examples of the tungsten carbene complex catalyst include $W(N-2,6-Pr^i_2C_6H_3)(CHBu^t)(OBu^t)_2$, $W(N-2,6-Pr^i_2C_6H_3)(CHBu^t)(OCMe_2CF_3)_2$, $W(N-2,6-Pr^i_2C_6H_3)(CHBu^t)(OCMe(CF_3)_2)_2$, $W(N-2,6-Pr^i_2C_6H_3)(CHCMe_2Ph)(OBu^t)_2$, $W(N-2,6-Pr^i_2C_6H_3)(CHCMe_2Ph)(OCMe_2CF_3)_2$, and $W(N-2,6-Pr^i_2C_6H_3)(CHCMe_2Ph)(OCMe(CF_3)_2)_2$, and combinations thereof. Herein, "$N-2,6-Pr^i_2C_6H_3$" refers to a 2,6-diisopropylphenylimino group, "CHBu$^t$" refers to a t-butyl methylene group (2,2-dimethylpropylidene group), "OBut" refers to a t-butoxy group, "$OCMe_2CF_3$" refers to a 1,1-bis(trifluoromethyl)ethoxy group, "$OCMe(CF_3)_2$" refers to a 1,1-bis(trifluoromethyl)ethoxy group, and "CHCMe$_2$Ph" refers to a 2-methyl-2-phenylpropylidene group. For example, the "$W(N-2,6-Pr^i_2C_6H_3)(CHBu^t)(OBut)_2$" refers to a (2,6-diisopropylphenylimino)(2,2-dimethylpropylidene)[bis(t-butoxy)]tungsten.

The amount of ring-opening metathesis polymerization catalyst (x) used, in a molar ratio based on the cyclic organic compound (i.e., cyclic organic olefin monomer) used in the polymerization with the catalyst (x), is such that catalyst (x):cyclic organic compound=preferably 1:100 to 1:2000000, more preferably 1:500 to 1:1000000, and even more preferably 1:1000 to 1:700000. If the amount of catalyst is too large, it may be difficult to remove the catalyst after the reaction, and, if the amount is too small, sufficient polymerization activity may not be realized.

In the ring-opening metathesis polymerization, a chain transfer agent may be included. There is no particular limitation on the chain transfer agent, but examples thereof include α-olefins such as 1-butene, 1-pentene, 1-hexene, 1-heptene, and 1-octene, and internal olefins such as 2-butene, 2-pentene, 2-hexene, 3-hexene, 2-heptene, 3-heptene, 2-octene, 3-octene, and 4-octene. They may be substituted with a hydroxyl group, an alkoxy group, an acyl group, a carbonyl group, an alkoxycarbonyl group, a halogen atom, or the like. They may be used alone or in a combination of a plurality of types.

There is no particular limitation on the amount of chain transfer agent used, as long as a polymer having a sufficient molecular weight is produced in the polymerization. For example, in the molar ratio of the chain transfer agent based on the cyclic olefin, cyclic olefin:chain transfer agent=preferably 1000:1 to 20:1, and more preferably 800:1 to 50:1.

The ring-opening metathesis polymerization may be performed in the absence or presence of solvent, but it is preferably performed in the presence of solvent. There is no particular limitation on the solvent that can be used, as long as it is inert to the ring-opening metathesis polymerization, and examples thereof include: aliphatic hydrocarbons such as hexane, heptane, octane, nonane, decane, undecane, and dodecane; aromatic hydrocarbons such as toluene, benzene, and xylene; ethers such as tetrahydrofuran; and halogenated hydrocarbons such as methylene chloride. If solvent is used, there is no particular limitation on the amount thereof to be used. However, in typical, it is preferably 1 to 1000 times by mass, more preferably 2 to 200 times by mass, and even more preferably 3 to 100 times by mass, of the mass of the cyclic organic compound. The ring-opening metathesis polymerization is performed, for example, at a temperature ranging from −78 to 200° C., and, for example, within 72 hours, although these parameters may vary depending on the use of solvent, the boiling point of solvent if used and like factors.

(Metal Salt (C))

The metal salt (C) constituting the composition of the present invention is at least one metal salt selected from the group consisting of an iron salt, a nickel salt, a copper salt, a manganese salt, and a cobalt salt. The metal atom of the metal salt (C) is selected from iron, nickel, copper, manganese, and cobalt, and combinations thereof. Of these metals, manganese or cobalt is more preferable, and cobalt is even more preferable.

The counter-ion of the metal atom of the metal salt (C) is preferably an anion derived from an organic acid, and examples thereof include acetic acid, stearic acid, dimethyldithiocarbamic acid, palmitic acid, 2-ethylhexanoic acid, neodecanoic acid, linoleic acid, tallic acid, oleic acid, capric acid, and naphthenic acid. The metal salt (C) is particularly preferably cobalt 2-ethylhexanoate, cobalt neodecanoate, or cobalt stearate.

In the present invention, the content of the metal salt (C) is preferably 50 to 1000 ppm, more preferably 100 to 800 ppm, and even more preferably 200 to 400 ppm, in terms of metal atoms based on the mass of the thermoplastic resin (B). If the content of the metal salt (C) as metal atoms is less than 50 ppm, the oxygen-absorbing properties of the obtained oxygen-absorbing resin composition may be insufficient. If the content of the metal salt (C) as metal atoms is more than 1000 ppm, the metal salt (C) aggregates in the obtained oxygen-absorbing resin composition, which may generate foreign substances or streaks and deteriorate the appearance.

(Bifunctional Processing Stabilizer (D))

The bifunctional processing stabilizer (D) constituting the composition of the present invention is a compound having an acrylate structure and a hindered phenol structure in a same molecule. The bifunctional processing stabilizer (D) can prevent resin deterioration due to heat, by scavenging polymer radicals generated when exposed to a high temperature substantially in the absence of oxygen.

Examples of the bifunctional processing stabilizer (D) include, but not necessarily limited to, 2-t-butyl-6-(3'-t-butyl-5'-methyl-hydroxybenzyl)-4-methylphenyl acrylate (e.g., commercially available under the product name SUMILIZER GM (manufactured by Sumitomo Chemical Co., Ltd.)), 2,4-di-t-amyl-6-(3',5'-di-t-amyl-2'-hydroxy-α-methylbenzyl)phenyl acrylate (commercially available under the product name SUMILIZER GS (manufactured by Sumitomo Chemical Co., Ltd.)), 2-t-butyl-6-(3'-t-butyl-2'-hydroxy-5'-methylbenzyl)-4-methylphenyl acrylate, and 2,5-di-t-butyl-6-(3',5'-di-t-butyl-2'-hydroxymethylbenzyl)phenyl acrylate, and combinations thereof. Of these materials, 2-t-butyl-6-(3'-t-butyl-5'-methyl-hydroxybenzyl)-4-methylphenyl acrylate, and 2,4-di-t-amyl-6-(3',5'-di-t-amyl-2'-hydroxy-α-methylbenzyl)phenyl acrylate are preferable, and 2,4-di-t-amyl-6-(3',5'-di-t-amyl-2'-hydroxy-α-methylbenzyl)phenyl acrylate is more preferable.

In the present invention, the bifunctional processing stabilizer (D) may be, for example, added to and mixed with the thermoplastic resin (B) in advance, may be added to and mixed with the oxygen-absorbing resin composition of the present invention separately from the thermoplastic resin (B), or may be added and mixed according to both manners described above in combination.

In the present invention, the content of the bifunctional processing stabilizer (D) is preferably 500 to 20000 ppm, more preferably 1000 to 10000 ppm, and even more preferably 2000 to 5000 ppm, based on the mass of the thermoplastic resin (B). If the content of the bifunctional processing stabilizer (D) is less than 500 ppm, radicals generated in an extruder may not be sufficiently scavenged, which allows cross-linking of the thermoplastic resin (B) and/or the gas barrier resin (A) to proceed, and thus the pelletized or formed film may have a poor appearance, or pelletizing itself may be impossible. If the content of the bifunctional processing stabilizer (D) is more than 20000 ppm, the oxygen absorption by the thermoplastic resin (B) may be inhibited, making the oxygen-absorbing properties of the obtained resin composition insufficient.

(Phenolic Primary Antioxidant (E))

The oxygen-absorbing resin composition of the present invention may further contain the phenolic primary antioxidant (E), in addition to the gas barrier resin (A), the thermoplastic resin (B), the metal salt (C), and the bifunctional processing stabilizer (D) described above.

In the present invention, the phenolic primary antioxidant (E) is a compound that can prevent resin deterioration due to oxidation, by scavenging peroxide radicals generated in the presence of oxygen.

Examples of the phenolic primary antioxidant (E) include, but not necessarily limited to, triethylene glycol-bis[3-(3-t-butyl-5-methyl-4-hydroxyphenyl)propionate], 1,6-hexanediol-bis[3-(3,5-di-t-butyl-4-hydroxyphenyl)propionate], 2,4-bis-(n-octyl)-6-(4-hydroxy-3, 5-di-t-butylanilino)-1,3,5-triazine, pentaerythrityl-tetrakis[3-(3,5-di-t-butyl-4-hydroxyphenyl)propionate](e.g., commercially available under the product name IRGANOX1010 (manufactured by BASF)), 2,2-thio-diethylene bis[3-(3,5-di-t-butyl-4-hydroxyphenyl propionate), octadecyl-3-(3,5-di-t-butyl-4-hydroxyphenyl)propionate (e.g., commercially available under the product name IRGANOX1076 (manufactured by BASF)), N,N'-hexamethylenebis(3,5-di-t-butyl-4-hydroxyhydrocinnamido), 3,5-di-t-butyl-4-hydroxybenzylphosphonate-diethyl ester, 1,3,5-trimethyl-2,4,6-tris(3,5-di-t-butyl-4-hydroxybenzyl)benzene, tris-(3,5-di-t-butyl-4-hydroxybenzyl)-isocyanurate, octylated diphenylamine, 2,4-bis[(octylthio)methyl]-o-cresol, and isooctyl-3-(3,5 di-t-butyl-4-hydroxyphenyl)propionate, and combinations thereof. Of these materials, pentaerythrityl-tetrakis[3-(3,5-di-t-butyl-4-hydroxyphenyl)propionate], and octadecyl-3-(3,5-di-t-butyl-4-hydroxyphenyl)propionate are preferable.

In the present invention, the phenolic primary antioxidant (E) may be, for example, added to and mixed with the thermoplastic resin (B) in advance, may be added to and mixed with the oxygen-absorbing resin composition of the present invention separately from the thermoplastic resin (B), or may be added and mixed according to both manners described above in combination.

In the present invention, the content of the phenolic primary antioxidant (E) is preferably 50 to 2000 ppm, more preferably 100 to 1000 ppm, and even more preferably 200 to 500 ppm, based on the mass of the thermoplastic resin (B). If the content of the phenolic primary antioxidant (E) is less than 50 ppm, peroxide radicals generated during storage and/or in an extruder may allow cross-linking of the thermoplastic resin (B) and/or the gas barrier resin (A) to proceed, and thus the pelletized or formed film may have a poor appearance. If the content of the phenolic primary antioxidant (E) is more than 2000 ppm, the oxygen absorption by the thermoplastic resin (B) may be inhibited, making the oxygen-absorbing properties of the obtained resin composition insufficient.

(Other Thermoplastic Resins (F) and Additives)

The oxygen-absorbing resin composition of the present invention may further contain another thermoplastic resin (F) within a range not impairing the effects of the present invention, in addition to the gas barrier resin (A), the thermoplastic resin (B), the metal salt (C), and the bifunctional processing stabilizer (D), and the phenolic primary antioxidant (E) that may be added as necessary.

Examples of the thermoplastic resin (F) include polyethylene, polypropylene, an ethylene-propylene copolymer, an ethylene or propylene copolymer (a copolymer containing ethylene or propylene and further containing at least one of the following monomers: α-olefins such as 1-butene, isobutene, 4-methyl-1-pentene, 1-hexene, and 1-octene; unsaturated carboxylic acids such as itaconic acid, methacrylic acid, acrylic acid, and maleic anhydride, salts, partial and complete esters, nitriles, amides, and anhydrides thereof; vinyl carboxylates such as vinyl formate, vinyl acetate, vinyl propionate, vinyl butylate, vinyl octanoate, vinyl dodecanoate, vinyl stearate, and vinyl arachidonate; vinylsilane compounds such as vinyltrimethoxysilane; unsaturated sulfonic acids and salts thereof; alkylthiols; vinylpyrrolidones, etc.), polyolefins such as poly(4-methyl-1-pentene) and poly(1-butene); polyesters such as poly(ethylene terephthalate), poly(butylene terephthalate), and poly(ethylene naphthalate); polystyrene; polycarbonate; and polyacrylates such as polymethylmethacrylate; and combinations thereof. If such a thermoplastic resin (F) is further contained, the content thereof is preferably 10% by mass or less of the total mass of the oxygen-absorbing resin composition of the present invention.

The oxygen-absorbing resin composition of the present invention may further contain at least one type of additive, within a range not inhibiting the actions of the present invention. Examples of the additive include plasticizers, photoinitiators, deodorants, ultraviolet absorbers, antistatic agents, lubricants, colorants, drying agents, fillers, processing aids, flame retardants, antifogging agents, and the like.

(Production of Oxygen-Absorbing Resin Composition)

The oxygen-absorbing resin composition of the present invention can be produced by mixing the above-described components (A) to (D), and, as necessary, the components (E) and (F) and additives. In production of the oxygen-absorbing resin composition of the present invention, there is no particular limitation on the method for mixing the components. Furthermore, there is no particular limitation on the order of components that are to be mixed.

A specific mixing method is preferably the melt-kneading method in view of the process simplicity and the cost. In this case, it is preferable to use an apparatus that has a good kneading ability to allow the components to be finely and uniformly dispersed because this can provide good oxygen-absorbing properties and good transparency and can prevent the generation or introduction of gels or aggregates.

Examples of apparatuses that can provide a good kneading ability include: continuous kneaders such as a continuous intensive mixer, a kneading-type twin-screw extruder (co-rotation or counter-rotation), a mixing roll, and a Ko-kneader; batch kneaders such as a high-speed mixer, a Banbury mixer, an intensive mixer, and a pressure kneader; apparatuses that use a rotary disk with a trituration mechanism such as a stone mill, for example, a KCK kneading extruder manufactured by KCK Co., Ltd.; apparatuses with a single-screw extruder provided with a kneading section (such as a Dulmage); simple kneaders such as a ribbon blender and a Brabender mixer. Among these apparatuses, continuous kneaders are preferable. In the present invention, it is preferable to use an apparatus in which an extruder and a pelletizer are installed in the discharge port of such a continuous kneader to perform kneading, extruding and palletizing simultaneously. Moreover, it is also possible to use twin-screw kneading extruders equipped with a kneading disk or a kneading rotor. A kneader may be used singly, or two or more kneaders may be coupled for use.

The kneading temperature is, for example, 120 to 300° C. In order to prevent oxidation of the thermoplastic resin (B), it is preferable to perform extrusion at low temperatures with the hopper port sealed with nitrogen. The longer kneading time results in the better results, however, in view of prevention of oxidation of the thermoplastic resin (B) and production efficiency, the kneading time is, for example, preferably 10 to 600 seconds, more preferably 15 to 200 seconds, and even more preferably 15 to 150 seconds.

In this manner, the oxygen-absorbing resin composition of the present invention can be obtained.

(Method for Producing Multilayer Structure and Molded Product)

There is no particular limitation on the method for obtaining the multilayer structure, but examples thereof include extrusion lamination, dry lamination, coinjection molding, and coextrusion molding. Examples of coextrusion molding include coextrusion lamination, coextrusion sheet molding, blown film coextrusion, and coextrusion blow molding.

A sheet, a film, a parison, or the like of the thus obtained multilayer structure may be reheated at a temperature below the melting point of the contained resins and uniaxially or biaxially oriented by thermoforming such as draw forming, rolling, pantographic orientation, blown film orientation, or blow molding, so that an oriented molded product can be obtained.

(Layer Configuration of Multilayer Structure)

In the layer configuration in the case of obtaining a multilayer structure using the oxygen-absorbing resin composition of the present invention, as a layer constituting an inner layer of the multilayer structure, a resin layer other than the oxygen-absorbing resin composition layer is preferably a hydrophobic resin having a relatively high level of gas-transmitting properties in order to facilitate absorption of oxygen inside the formed multilayer structure, and is preferably heat-sealable for some applications. Examples of the resin include polyolefins such as polyethylene and polypropylene, an ethylene-vinyl acetate copolymer, and the like. Meanwhile, a resin constituting an outer layer of the multilayer structure is preferably a resin having excellent processability in molding process and excellent mechanical physical properties. Examples of the resin include polyolefins such as polyethylene and polypropylene, polyamide, polyester, polyether, polyvinyl chloride, and the like.

In order to prevent oxygen from entering from the outside of the container, a layer made of a gas barrier resin such as polyamide or an ethylene-vinyl alcohol copolymer is preferably laminated on the outer layer side of the oxygen-absorbing resin composition layer. Furthermore, another layer may be interposed between the oxygen-absorbing resin composition layer and the gas barrier resin layer.

If the multilayer structure of the present invention is used, for example, for a retort packaging material or a container lid, the outer layer is made of polyolefin such as polyamide, polyester, or polypropylene, and particularly preferably polypropylene. The inner layer is preferably made of polypropylene. Polyolefins are preferable because of their moisture resistance, mechanical properties, cost, heat-sealing properties and the like. Polyesters are preferable because of their mechanical properties, thermal resistance, and the like.

In consideration of an application in which the multilayer structure of the present invention is used, for example, as a packaging material that is exposed to high humidity, a layer having high vapor barrier properties is preferably provided on both sides of the oxygen-absorbing resin composition layer or on the side exposed to high humidity when the packaging material is used. A molded product having such a layer is preferable because the retention period of oxygen-absorbing properties is particularly prolonged, and as a result, very high gas barrier properties can be maintained for a longer time. A molded product such as a multilayer container having the oxygen-absorbing resin composition in the innermost layer promptly absorbs oxygen in the container.

(Applications)

The molded product of the present invention has excellent oxygen-absorbing properties, and the amount of odorous substances that are generated or transferred thereby in association with oxidation is extremely small, and thus it can be preferably used for contents that tend to deteriorate due to the influence of oxygen, such as foods, drugs, and the like. In particular, it can be preferably used as a packaging material for foods and drinks whose flavor is important, pet foods that are sensitive to a change in the quality, and the like.

EXAMPLES

Hereinafter, the present invention will be described by way of examples, but the present invention is not limited to the following examples. Note that obtained resin compositions and the like were evaluated as follows.

(Ethylene Unit Content and Saponification Degree of EVOH (A))

The ethylene unit content and the saponification degree of the EVOH (A) were calculated based on a nuclear magnetic resonance ($^1$H-NMR) measurement ("JNM-GX-500" manufactured by JEOL Ltd.) using DMSO-$d_6$ as solvent.

(Molecular Structure of Thermoplastic Resin (B))

The structure was determined by a nuclear magnetic resonance ($^1$H-NMR, $^{13}$C-NMR) measurement ("JNM-GX-500" manufactured by JEOL Ltd.) using CDCl$_3$ as solvent.

(Number-Average Molecular Weight and Weight-Average Molecular Weight of Thermoplastic Resin (B))

Measurement was performed by gel permeation chromatography (GPC), and values were presented in terms of polystyrene molecular weight. The measurement conditions were as follows.

Measurement Conditions

Apparatus: Gel permeation chromatography system "HLC-8220" manufactured by Tosoh Corporation Column: "TSKgel SuperHM-H"×2+"TSKgel SuperH2500" (6.0 mmϕ×150 mm×3) manufactured by Tosoh Corporation Column Temperature: 40° C.

Mobile phase: Tetrahydrofuran, Flow rate: 0.6 mL/min

Detector: RI

Sample Concentration: 0.1% by weight (tetrahydrofuran solution)

(Oxygen-Absorbing Properties)

Pellets of the oxygen-absorbing resin composition were milled using an ultra centrifugal mill ("ZM-100" manufactured by Retsch). Then, 0.1 g of the obtained milled product was added in a 30 mL glass container, and a 2 mL glass container containing 1 mL of water was placed in the 30 mL glass container, on which packing made of Teflon (registered trademark)/silicone was put and sealing with aluminum was performed. After storage at 20° C. or 60° C. for a predetermined period of time, the oxygen concentration inside the container was measured using a residual oxygen meter ("PACK MASTER" manufactured by Iijima Electronics Corporation). Furthermore, the oxygen concentration measured when the oxygen-absorbing resin composition was placed was corrected using the oxygen concentration in a 30 mL glass container in which a milled product of the oxygen-absorbing resin composition was not placed but a 2 mL glass container containing 1 mL of water was placed, so that the oxygen absorption rate per 1 g of milled product was calculated.

(Odor Sensory Evaluation)

Pellets of the oxygen-absorbing resin composition were milled using an ultra centrifugal mill ("ZM-100" manufactured by Retsch). Then, 0.1 g of the obtained milled product was added in a 30 mL glass container, and a 2 mL glass container containing 1 mL of water was placed in the 30 mL glass container, on which packing made of Teflon (registered trademark)/silicone was put and sealing with aluminum was performed. After storage at 60° C. for one week, the aluminum sealing was removed, and odors were subjected to sensory evaluation following the evaluation criteria below.

0. No odor
1. Barely detectable odor that is not perceptible of its kind (Detection threshold)
2. Light odor that is perceptible of its kind (Recognition threshold)
3. Medium level of odor that is easily noticeable
4. Strong odor
5. Extremely high odor (Appearance of Multilayer Sheet)

The appearance of a multilayer sheet was visually evaluated following the evaluation criteria below.

Evaluation Criteria

1. There is no foreign substance/defect.
2. Foreign substance/defect is slightly seen.
3. Streak is slightly seen.
4. There is foreign substance/defect, and streak is seen.
5. There is foreign substance/defect, streak is seen, and there are pinholes at some points.

(Amount of Oxygen that had Entered Pouch after Retort Treatment)

The dissolved oxygen concentration inside a pouch was measured using an optical oxygen meter ("Fibox3" (product name) manufactured by PreSens), immediately after the retort treatment and after storage for a predetermined period of time (after storage for one day, for three days, for seven days, and for 30 days). The measured value was corrected using dissolved oxygen concentration before the retort treatment, and the obtained value was taken as the amount of oxygen that had entered after the retort treatment.

(Production of Multilayer Sheet)

A multilayer sheet (layer configuration and thickness of each layer: PP/Tie/oxygen-absorbing resin composition/Tie/PP=225 μm/25 μm/50 μm/25 μm/225 μm) was produced using the following coextrusion film-forming method.

Multilayer Sheet Production Conditions

Apparatus: Feed block with three-kind five-layer film extrusion molding machine

Extruder:
32φ Single-screw extruder (manufactured by Research Laboratory of Plastics Technology Co., Ltd.) (PP layer)
20φ Single-screw extruder (manufactured by Technovel Corporation) (Tie layer)
20φ Single-screw extruder (manufactured by Toyo Seiki Seisaku-Sho, Ltd.) (oxygen-absorbing resin composition layer)

Number of rotations:
32φ Single-screw extruder (PP layer) 97 rpm
20φ Single-screw extruder (Tie layer) 36 rpm
20φ Single-screw extruder (oxygen-absorbing resin composition layer) 42 rpm Extrusion temperature:
32φ Single-screw extruder (PP layer) feeding unit/compression unit/weighing unit=170° C./230° C./230° C.
20φ Single-screw extruder (Tie layer) feeding unit/compression unit/weighing unit=170° C./230° C./230° C.
20φ Single-screw extruder (oxygen-absorbing resin composition layer) feeding unit/compression unit/weighing unit=170° C./220° C./220° C.

Die temperature: 230° C.
Cooling roll temperature: 90° C.
Drawing speed: 1.1 m/min (where "PP" stands for polypropylene: "NOVATEC (registered trademark) PP EA7A" manufactured by Japan Polypropylene Corporation (hereinafter, abbreviated as PP), and "Tie" stands for "ADMER (registered trademark) QF500" manufactured by Mitsui Chemicals, Inc. (hereinafter, abbreviated as Tie).)

(Production of Pouch)

A non-oriented polypropylene film ("RXC-18 (product name)" manufactured by Tohcello Co., Ltd., thickness 50 μm, hereinafter abbreviated as CPP), an aluminum foil (manufactured by Sumikei Aluminum Foil Co., Ltd., thickness 7 μm, hereinafter abbreviated as Al), an oriented nylon film ("EMBLEM (registered trademark)ON-BC" manufactured by Unitika Ltd., thickness 15 μm, hereinafter abbreviated as ON), and an oriented polyethylene terephthalate film ("Lumirror (registered trademark) P60" manufactured by Toray Industries, Inc., thickness 12 μm, hereinafter it may be abbreviated as "PET") were laminated using a two-part adhesive ("TAKELAC (registered trademark) A-520" and "TAKENATE (registered trademark) A-50" manufactured by Mitsui Chemicals, Inc., hereinafter abbreviated as AC), and thus an aluminum layer-containing laminated film (CPP/AC/Al/AC/ONy/AC/PET=50 μm/2 μm/7 μm/2 μm/15 μm/2 μm/12 μm) was produced.

The multilayer sheet (PP/Tie/oxygen-absorbing resin composition/Tie/PP=225 μm/25 μm/50 μm/25 μm/225 μm) produced according to the above-described multilayer sheet production conditions and the aluminum layer-containing laminated film (CPP/AC/Al/AC/ONy/AC/PET=50 μm/2 μm/7 μm/2 μm/15 μm/2 μm/12 μm) produced by the above-described method were cut into pieces each having a size of 12 cm×12 cm, and the pieces were laid over each other such that the PP layer and the CPP layer faced each other, three sides of which were heat-sealed to produce a bag. Then, a 5·mmφ oxygen sensor spot ("SP-PSt3-GSUP-YOP-D5" manufactured by PreSens) of a glass base-type for an optical oxygen meter ("Fibox3" manufactured by PreSens) was attached using an epoxy-based adhesive to the inner face (PP layer face) of the bag. Thereafter, 40 mL of degassed water having a dissolved oxygen concentration of 1.6 to 1.8 ppm (23° C.) obtained by purging with nitrogen bubbling on ion-exchanged water was placed in the bag, and the remained one side was sealed with heat-sealing, so that a pouch enclosing degassed water was produced.

(Retort Treatment of Pouch)

The obtained pouch was retort treated at 120° C. for 30 minutes using a retorting apparatus (high-temperature high-pressure cooking sterilizing tester "RCS-60/10RSPXG-FAM" manufactured by Hisaka Works, Ltd.).

Synthesis Example 1

Synthesis of Thermoplastic Resin (B) (Poly(dicyclopentadiene) (B-1))

A 20-L four-neck flask equipped with a stirrer and a thermometer was purged with argon gas, after which 7.6 L of toluene and 1766 g (13.36 mol) of dehydrated dicyclopentadiene were added thereto and stirring was performed. Subsequently, 10.2 g (0.027 mol) of tungsten hexachloride was added to a 1.0-L three-neck flask, and the flask was purged with argon gas, after which 7.6 g (0.054 mol) of diallyldimethylsilane dissolved in 0.4 L of toluene was added thereto and stirring was performed. The thus obtained catalyst solution containing tungsten hexachloride was added dropwise to the four-neck flask. After the adding dropwise, stirring was performed at room temperature for 4 hours, after which 100 mL of NaOH/methanol solution having a concentration of 0.2% by weight was added to the four-neck flask. The reacted liquid was transferred to a 50-L container, and 24 L of toluene was added thereto, after which an insoluble matter was removed by filtration. The obtained filtrate was washed with ion-exchanged water, and thus a catalyst residue was removed. An organic layer after the washing with water was added to 300 L of methanol. The precipitate was collected by filtration, and methanol was removed using a vacuum dryer. The obtained precipitate was dissolved in 24 L of toluene, and the solution was added to 300 L of methanol to cause reprecipitation. The precipitate was collected by filtration and further dried at room temperature for one week using a vacuum dryer, and thus 1352 g (yield 76.1%) of poly(dicyclopentadiene) (B-1) having a number-average molecular weight of 14000, a weight-average molecular weight of 267000, and a content of oligomer (molecular weight of less than 1000) of 2.49% was obtained. In this example, [poly(dicyclopentadiene)] was poly(bicyclo[3.3.0]octa-2-en-6,8-diylidene).

Reference Synthesis Example 1

Synthesis of Poly(Dicyclopentadiene) Using Ruthenium Catalyst

A 300 mL four-neck flask equipped with a stirrer and a thermometer was purged with nitrogen, after which 90 mL of toluene, 30.9 g (0.234 mol) of dehydrated dicyclopentadiene, and 105 mg (0.94 mmol) of cis-4-octene were added thereto. Then, in a nitrogen atmosphere, a catalyst solution prepared from 36.7 mg (0.059 mmol) of benzylidene(1,3-dimesitylimidazolidine-2-ylidene)(tricyclohexylphosphine) ruthenium dichloride and 5 mL of toluene was added dropwise to the four-neck flask. Immediately after the adding dropwise, the reacted liquid was gelled and then solidified and thus stirring became impossible, and poly(dicyclopentadiene) was not obtained.

Comparative Synthesis Example 1

Synthesis of Thermoplastic Resin (B) (Polynorbornene (B-3))

A 300 mL four-neck flask equipped with a stirrer and a thermometer was purged with nitrogen, after which 90 mL of toluene, 22.0 g (0.234 mol) of norbornene, and 105 mg (0.94 mmol) of cis-4-octene were added thereto. Subsequently, in a nitrogen atmosphere, a catalyst solution prepared from 36.7 mg (0.059 mmol) of benzylidene (1,3-dimesitylimidazolidine-2-ylidene) (tricyclohexylphosphine) ruthenium dichloride and 5 mL of toluene was added dropwise to the four-neck flask. After the adding dropwise, stirring was performed at room temperature for 2 hours, after which 8.7 mg (17.6 mmol) of ethyl vinyl ether was added to the reacted liquid. Subsequently, the reacted liquid was added to 2 L of methanol. The precipitate was collected by filtration, and methanol was removed using a vacuum dryer. The obtained precipitate was dissolved in 100 L of toluene, and the solution was added to 2 L of methanol to cause reprecipitation. The precipitate was collected by filtration and further dried at room temperature for one week using a vacuum dryer, and thus 15.0 g (yield 68.0%) of polynorbornene (B-3) having a weight-average molecular weight of 154000 and a content of oligomer (molecular weight of less than 1000) of 2.8% was obtained.

Example 1

96 parts by mass of ethylene-vinyl alcohol copolymer (EVOH) (ethylene unit content 27 mol %, saponification degree 99 mol % or more, MFR 4.0 g/10 min (210° C., 2160 g load), oxygen transmission rate 0.2 mL·20 μm/(m²·day·atm)) as a gas barrier resin (A-1) and 4 parts by mass of poly(dicyclopentadiene) prepared in Synthesis Example 1 as a thermoplastic resin (B-1), and, based on the mass of the thermoplastic resin (B), 2121 ppm of cobalt stearate (cobalt atoms 200 ppm) as a metal salt (C-1), 2000 ppm of 2,4-di-t-amyl-6-(3',5'-di-t-amyl-2'-hydroxy-α-methylbenzyl)phenyl acrylate ("SUMILIZER (registered trademark) GS" manufactured by Sumitomo Chemical Co., Ltd.) as a bifunctional processing stabilizer (D-1), and 200 ppm of octadecyl-3-(3,5-di-t-butyl-4-hydroxyphenyl)propionate ("IRGANOX (registered trademark) 1076" manufactured by BASF) as a phenolic primary antioxidant (E-1) were dry-blended, melt-kneaded using a twin-screw extruder following the melt-kneading conditions, and granulated, and thus pellets of an oxygen-absorbing resin composition (1-1) were obtained.

Melt-Kneading Conditions
Apparatus: 26 mmφ twin-screw extruder (Labo Plastomill "15C300" manufactured by Toyo Seiki Seisaku-Sho, Ltd.)
L/D: 25
Screw: Co-directional and completely intermeshed type
Number of die holes: Two holes (3 mmφ)
Extrusion temperature: Feeding unit/compression unit/weighing unit/die=200° C./230° C./230° C./230° C.
Number of rotations: 100 rpm
Discharge rate: About 5 kg/hour.

Furthermore, the obtained oxygen-absorbing resin composition (1-1) was used to obtain a multilayer sheet (1-2) according to the above-described multilayer sheet production conditions. The obtained multilayer sheet (1-2) was used to produce a pouch (1-3) according to the above-described pouch production conditions.

Evaluation of oxygen-absorbing properties (oxygen absorption rate) and sensory evaluation of odors of the obtained oxygen-absorbing resin composition (1-1), evaluation of the appearance of the multilayer sheet (1-2), and evaluation of the amount of oxygen that had entered the pouch (1-3) after retort treatment were performed according to the above-described methods. Table 1 shows the production conditions of this example, and Tables 2 and 3 show the obtained evaluation results.

Examples 2 to 20

As shown in Table 1, oxygen-absorbing resin compositions (2-1) to (20-1) of Examples 2 to 20 were produced as in the production of the oxygen-absorbing resin composition (1-1) of Example 1, except that the type of the gas barrier resin (A), the mass ratio between (A)/(B), the concentration of the metal salt (C) in terms of metal atoms, the concentration of the bifunctional processing stabilizer (D), and the concentration of the phenolic primary antioxidant (E) were changed. Furthermore, multilayer sheets (2-2) to (20-2) were produced as in the production of the multilayer sheet (1-2) of Example 1, except that the oxygen-absorbing resin composition (1-1) was changed to the oxygen-absorbing resin compositions (2-1) to (20-1). Furthermore, pouches (2-3) to (20-3) were produced as in the production of the pouch (1-3) of Example 1, except that the multilayer sheet (1-1) was changed to the multilayer sheets (2-2) to (20-2). The obtained oxygen-absorbing resin compositions, multilayer sheets, and pouches were evaluated. Tables 2 and 3 show the evaluation results. In Example 2, an ethylene-vinyl alcohol copolymer (EVOH) (ethylene unit content 32 mol %, saponification degree 99 mol % or more, MFR 3.7 g/10 min (210° C., 2160 g load), oxygen transmission rate 0.4 mL·20 μm/(m²·day·atm)) was used as the gas barrier resin (A-2).

Comparative Example 1

Pellets of a resin composition (C1-1), an oxygen-absorbing multilayer sheet (C1-2), and a pouch (C1-3) were obtained as in the production of the oxygen-absorbing resin composition (1-1), the multilayer sheet (1-2), and the pouch (1-3) of Example 1, using only the gas barrier resin (A-1).

Comparative Example 2

Pellets of a resin composition (C2-1), an oxygen-absorbing multilayer sheet (C2-2), and a pouch (C2-3) were obtained as in the production of the oxygen-absorbing resin composition (1-1), the multilayer sheet (1-2), and the pouch (1-3) of Example 1, except that the metal salt (C-1) was not added.

Comparative Example 3

Melt-kneading was performed using a twin-screw extruder as in the production of the oxygen-absorbing resin composition (1-1), the multilayer sheet (1-2), and the pouch (1-3) of Example 1, except that the bifunctional processing stabilizer (D-1) was not added. However, foreign substances were generated by this melt-kneading, and pellets of an oxygen-absorbing resin composition (C3-1) were not obtained.

Comparative Example 4

Pellets of a resin composition (C4-1), an oxygen-absorbing multilayer sheet (C4-2), and a pouch (C4-3) were obtained as in the production of the oxygen-absorbing resin composition (1-1), the multilayer sheet (1-2), and the pouch (1-3) of Example 1, except that polybutadiene (polybutadiene rubber "NIPOL (registered trademark) BR1220" manufactured by Zeon Corporation, having a number-average molecular weight of 160000) (B-2) was used as the thermoplastic resin (B-2).

Comparative Example 5

Pellets of a resin composition (C5-1), an oxygen-absorbing multilayer sheet (C5-2), and a pouch (C5-3) were obtained as in the production of the oxygen-absorbing resin composition (1-1), the multilayer sheet (1-2), and the pouch (1-3) of Example 1, except that the polynorbornene prepared in Comparative Synthesis Example 2 was used as the thermoplastic resin (B-3).

Table 1 shows the production conditions of the resin compositions (C1-1) to (C5-1) of the comparative examples. Table 2 shows the evaluation results of the resin compositions (C1-1) to (C5-1). Table 3 shows the evaluation results of the multilayer sheets (C1-2), (C2-2), (C4-2), and (C5-2), and the pouches (C1-3), (C2-3), (C4-3), and (C5-3).

TABLE 1

| | Oxygen-Absorbing Resin Composition | | | | | | | | |
|---|---|---|---|---|---|---|---|---|---|
| | Gas Barrier Resin (A) | Thermoplastic Resin (B) | Mass Ratio (A)/(B) | Metal Salt (C) | | | Bifunctional Processing Stabilizer (D) | | Phenolic Primary Antioxidant (E) | |
| | | | | Type of Metal Salt | Concentration of Metal Salt (ppm) | Concentration of Metal Salt in terms of Metal Atoms (ppm) | (D) Type | Concentration (ppm) | (E) Type | Concentration (ppm) |
| Example 1 | A-1 | B-1 | 96/4 | C-1 | 2121 | 200 | D-1 | 2000 | E-1 | 200 |
| Example 2 | A-2 | B-1 | 96/4 | C-1 | 2121 | 200 | D-1 | 2000 | E-1 | 200 |
| Example 3 | A-1 | B-1 | 96/4 | C-1 | 2121 | 200 | D-1 | 500 | E-1 | 200 |
| Example 4 | A-1 | B-1 | 96/4 | C-1 | 2121 | 200 | D-1 | 1000 | E-1 | 200 |
| Example 5 | A-1 | B-1 | 96/4 | C-1 | 2121 | 200 | D-1 | 5000 | E-1 | 200 |
| Example 6 | A-1 | B-1 | 96/4 | C-1 | 2121 | 200 | D-1 | 10000 | E-1 | 200 |
| Example 7 | A-1 | B-1 | 96/4 | C-1 | 2121 | 200 | D-1 | 20000 | E-1 | 200 |
| Example 8 | A-1 | B-1 | 98/2 | C-1 | 2121 | 200 | D-1 | 2000 | E-1 | 200 |
| Example 9 | A-1 | B-1 | 94/6 | C-1 | 2121 | 200 | D-1 | 2000 | E-1 | 200 |
| Example 10 | A-1 | B-1 | 92/8 | C-1 | 2121 | 200 | D-1 | 2000 | E-1 | 200 |
| Example 11 | A-1 | B-1 | 96/4 | C-1 | 530 | 50 | D-1 | 2000 | E-1 | 200 |
| Example 12 | A-1 | B-1 | 96/4 | C-1 | 1061 | 100 | D-1 | 2000 | E-1 | 200 |
| Example 13 | A-1 | B-1 | 96/4 | C-1 | 4242 | 400 | D-1 | 2000 | E-1 | 200 |
| Example 14 | A-1 | B-1 | 96/4 | C-1 | 8484 | 800 | D-1 | 2000 | E-1 | 200 |
| Example 15 | A-1 | B-1 | 96/4 | C-1 | 10605 | 1000 | D-1 | 2000 | E-1 | 200 |
| Example 16 | A-1 | B-1 | 96/4 | C-1 | 2121 | 200 | D-1 | 2000 | E-1 | 50 |
| Example 17 | A-1 | B-1 | 96/4 | C-1 | 2121 | 200 | D-1 | 2000 | E-1 | 100 |
| Example 18 | A-1 | B-1 | 96/4 | C-1 | 2121 | 200 | D-1 | 2000 | E-1 | 500 |
| Example 19 | A-1 | B-1 | 96/4 | C-1 | 2121 | 200 | D-1 | 2000 | E-1 | 1000 |
| Example 20 | A-1 | B-1 | 96/4 | C-1 | 2121 | 200 | D-1 | 2000 | E-1 | 2000 |
| Comparative Example 1 | A-1 | — | 100/0 | — | — | — | — | — | — | — |
| Comparative Example 2 | A-1 | B-1 | 96/4 | — | — | — | D-1 | 2000 | E-1 | 200 |
| Comparative Example 3 | A-1 | B-1 | 96/4 | C-1 | 2121 | 200 | — | — | E-1 | 200 |
| Comparative Example 4 | A-1 | B-2 | 96/4 | C-1 | 2121 | 200 | D-1 | 2000 | E-1 | 200 |
| Comparative Example 5 | A-1 | B-3 | 96/4 | C-1 | 2121 | 200 | D-1 | 2000 | E-1 | 200 |

TABLE 2

| | Oxygen-Absorbing Resin Composition/ Number of Resin Composition | Test Method Form | Amount (g) | Oxygen Absorption Rate (ml/g) 20° C./100% RH | | | 60° C./100% RH | | | Odor after 60° C./ 1 week Sensory Evaluation |
|---|---|---|---|---|---|---|---|---|---|---|
| | | | | After 3 days | After 7 days | After 14 days | After 1 day | After 3 days | After 7 days | |
| Example 1 | 1-1 | Powder | 0.1 | 2.5 | 3.1 | 6.0 | 4.9 | 5.7 | 9.2 | 1 |
| Example 2 | 2-1 | Powder | 0.1 | 2.7 | 3.2 | 6.3 | 5.1 | 6.0 | 9.4 | 1 |
| Example 3 | 3-1 | Powder | 0.1 | 3.1 | 3.6 | 6.6 | 6.1 | 7.1 | 9.9 | 1 |
| Example 4 | 4-1 | Powder | 0.1 | 3.1 | 3.6 | 6.6 | 6.1 | 7.1 | 9.9 | 1 |
| Example 5 | 5-1 | Powder | 0.1 | 1.9 | 2.6 | 5.4 | 4.6 | 5.1 | 8.6 | 1 |
| Example 6 | 6-1 | Powder | 0.1 | 1.4 | 2.1 | 4.9 | 3.6 | 3.9 | 7.6 | 1 |
| Example 7 | 7-1 | Powder | 0.1 | 0.9 | 1.6 | 4.1 | 2.9 | 3.3 | 6.9 | 1 |
| Example 8 | 8-1 | Powder | 0.1 | 1.3 | 1.6 | 3.0 | 2.7 | 3.2 | 5.0 | 1 |
| Example 9 | 9-1 | Powder | 0.1 | 3.5 | 4.6 | 9.2 | 6.3 | 8.2 | 13.7 | 1 |
| Example 10 | 10-1 | Powder | 0.1 | 5.0 | 6.2 | 12.0 | 8.8 | 10.2 | 16.9 | 1 |
| Example 11 | 11-1 | Powder | 0.1 | 1.1 | 1.4 | 3.9 | 3.1 | 3.4 | 7.1 | 1 |
| Example 12 | 12-1 | Powder | 0.1 | 1.6 | 2.1 | 5.1 | 3.4 | 4.1 | 7.6 | 1 |
| Example 13 | 13-1 | Powder | 0.1 | 3.1 | 3.6 | 6.7 | 6.1 | 6.9 | 10.1 | 1 |
| Example 14 | 14-1 | Powder | 0.1 | 3.2 | 3.5 | 6.4 | 5.9 | 6.8 | 10.2 | 1 |
| Example 15 | 15-1 | Powder | 0.1 | 3.0 | 3.4 | 6.5 | 6.0 | 7.0 | 9.9 | 1 |
| Example 16 | 16-1 | Powder | 0.1 | 2.0 | 2.5 | 5.4 | 4.5 | 4.9 | 8.3 | 1 |
| Example 17 | 17-1 | Powder | 0.1 | 2.1 | 2.6 | 5.6 | 4.6 | 5.1 | 8.4 | 1 |
| Example 18 | 18-1 | Powder | 0.1 | 3.1 | 3.6 | 6.4 | 6.1 | 7.0 | 9.8 | 1 |
| Example 19 | 19-1 | Powder | 0.1 | 1.4 | 2.1 | 5.1 | 3.4 | 3.9 | 7.4 | 1 |
| Example 20 | 20-1 | Powder | 0.1 | 0.9 | 1.6 | 3.9 | 3.1 | 3.4 | 6.9 | 1 |
| Comparative Example 1 | C1-1 | Powder | 0.1 | 0.0 | 0.1 | 0.3 | 0.1 | 0.3 | 0.5 | 1 |
| Comparative Example 2 | C2-1 | Powder | 0.1 | 0.1 | 0.3 | 0.5 | 0.5 | 0.7 | 1.9 | 1 |
| Comparative Example 3 | C3-1 | | | Not Pelletized | | | | | | |
| Comparative Example 4 | C4-1 | Powder | 0.1 | 0.5 | 1.3 | 2.5 | 3.1 | 3.3 | 6.6 | 2 |
| Comparative Example 5 | C5-1 | Powder | 0.1 | 0.2 | 0.4 | 1.3 | 5.7 | 10.3 | 11.7 | 1 |

TABLE 3

| | Number of Multi-layer Sheet | Appearance | Number of Pouch | Amount of Oxygen that had entered after Retort Treatment (ppm) Retort Treatment at 120° C./30 min., and Storage at 20° C./65% RH | | | |
|---|---|---|---|---|---|---|---|
| | | | | After 1 day | After 3 days | After 7 days | After 30 days |
| Example 1 | 1-2 | 1 | 1-3 | -1.2 | -1.2 | -1.2 | -1.9 |
| Example 2 | 2-2 | 1 | 2-3 | -1.3 | -1.4 | -1.5 | -1.7 |
| Example 3 | 3-2 | 3 | 3-3 | -1.4 | -1.6 | -1.7 | -2.5 |
| Example 4 | 4-2 | 3 | 4-3 | -1.4 | -1.6 | -1.7 | -2.5 |
| Example 5 | 5-2 | 1 | 5-3 | -1.0 | -1.1 | -1.1 | -1.5 |
| Example 6 | 6-2 | 1 | 6-3 | -0.9 | -0.9 | -0.9 | -1.2 |
| Example 7 | 7-2 | 1 | 7-3 | -0.7 | -0.7 | -0.7 | -1.0 |
| Example 8 | 8-2 | 1 | 8-3 | -0.6 | -0.6 | -0.6 | -0.9 |
| Example 9 | 9-2 | 1 | 9-3 | -1.8 | -1.9 | -2.0 | -3.1 |
| Example 10 | 10-2 | 2 | 10-3 | -2.3 | -2.4 | -2.4 | -3.8 |
| Example 11 | 11-2 | 1 | 11-3 | -0.6 | -0.7 | -0.7 | -0.9 |
| Example 12 | 12-2 | 1 | 12-3 | -0.8 | -0.8 | -0.9 | -1.1 |
| Example 13 | 13-2 | 1 | 13-3 | -1.3 | -1.6 | -1.6 | -2.6 |
| Example 14 | 14-2 | 2 | 14-3 | -1.4 | -1.6 | -1.7 | -2.4 |
| Example 15 | 15-2 | 3 | 15-3 | -1.5 | -1.5 | -1.8 | -2.5 |
| Example 16 | 16-2 | 3 | 16-3 | -0.9 | -1.0 | -1.0 | -1.3 |
| Example 17 | 17-2 | 2 | 17-3 | -1.0 | -1.1 | -1.2 | -1.5 |
| Example 18 | 18-2 | 1 | 18-3 | -1.4 | -1.6 | -1.7 | -2.5 |
| Example 19 | 19-2 | 1 | 19-3 | -0.8 | -0.9 | -0.9 | -1.2 |
| Example 20 | 20-2 | 1 | 20-3 | -0.7 | -0.8 | -0.6 | -1.0 |
| Comparative Example 1 | C1-2 | 1 | C1-3 | 0.9 | 1.1 | 1.6 | 2.1 |
| Comparative Example 2 | C2-2 | 1 | C2-3 | 0.7 | 0.9 | 1.4 | 2.0 |
| Comparative Example 3 | | | Not Pelletized | | | | |
| Comparative Example 4 | C4-2 | 2 | C4-3 | -0.4 | -0.3 | -0.3 | -0.2 |
| Comparative Example 5 | C5-2 | 2 | C5-3 | -0.4 | -0.3 | 0.0 | 0.5 |

The resin composition (C1-1) of Comparative Example 1 did not substantially exhibit oxygen-absorbing properties because it did not contain the thermoplastic resin (B), the metal salt (C), and the bifunctional processing stabilizer (D). The resin composition (C2-1) of Comparative Example 2 merely exhibited slight oxygen absorption because it did not contain the metal salt (C). All of the pouches (1-3) to (20-3)

using the multilayer sheets (1-2) to (20-2) obtained in Examples 1 to 20 effectively suppressed entrance of oxygen after the retort treatment compared with the pouch (C13) using the multilayer sheet (C1-2) of Comparative Example 1 and the pouch (C23) using the multilayer sheet (C2-2) of Comparative Example 2.

Since the resin composition (C3-1) of Comparative Example 3 did not contain the bifunctional processing stabilizer (D), foreign substances were generated during melt-kneading process using a twin-screw extruder, and pellets were not obtained. If polymer radicals generated when resin compositions are exposed to a high temperature in the absence of oxygen are scavenged by the bifunctional processing stabilizer (D), deterioration of the resin compositions due to heat is significantly suppressed. Accordingly, in the examples, generation of foreign substances during melt-kneading was suppressed, and good pellets were obtained, and, moreover, the appearance when processed into a multilayer sheet was also good.

All of the oxygen-absorbing resin compositions (1-1) to (20-1) obtained in Examples 1 to 20 exhibited excellent oxygen-absorbing properties and the amount of odors generated thereby after oxygen absorption was small compared with the resin composition (C4-1) of Comparative Example 4. All of the multilayer sheets (1-2) to (20-2) obtained in Examples 1 to 20 exhibited better appearances compared with the multilayer sheet (C4-2) of Comparative Example 4. All of the pouches (1-3) to (20-3) obtained in Examples 1 to 20 effectively suppressed entrance of oxygen after the retort treatment compared with the pouch (C4-3) of Comparative Example 4.

The oxygen-absorbing resin compositions (1-1) to (20-1) obtained in Examples 1 to 20 exhibited oxygen-absorbing properties at 60° C./100% RH that were similar to or better than those of the resin composition (C5-1) of Comparative Example 5. Furthermore, all of the oxygen-absorbing resin compositions (1-1) to (20-1) obtained in Examples 1 to 20 exhibited oxygen-absorbing properties at 20° C./100% RH that were better than those of the resin composition (C5-1) of Comparative Example 5. All of the multilayer sheets (1-2) to (20-2) obtained in Examples 1 to 20 exhibited better appearances compared with the multilayer sheet (C5-2) of Comparative Example 5. All of the pouches (1-3) to (20-3) obtained in Examples 1 to 20 effectively suppressed entrance of oxygen after the retort treatment compared with the pouch (C5-3) of Comparative Example 5.

As described above, the oxygen-absorbing resin compositions of the present invention obtained in Examples 1 to 20 exhibit excellent oxygen-absorbing properties and the amount of odors that are generated thereby after oxygen absorption is reduced. Furthermore, the compositions of the present invention exhibit an excellent appearance when molded into a desired multilayer structure such as an oxygen-absorbing multilayer sheet because foreign substances are not generated during melt-kneading, and a pouch using this oxygen-absorbing multilayer sheet can suppress oxygen ingress into the pouch after the retort treatment for a long period of time.

INDUSTRIAL APPLICABILITY

According to the present invention, it is possible to provide an oxygen-absorbing composition that has excellent oxygen-absorbing properties and enables to reduce odors generated during oxygen absorption. A molded product obtained from a multilayer structure using the composition of the present invention can, for example, absorb oxygen contained in the content after retort treatment, and suppress entrance of oxygen from the outside for a long period of time. Accordingly, the oxygen-absorbing resin composition of the present invention is useful, for example, for packaging of foods, drinks, drugs, and the like sensitive to oxygen.

The invention claimed is:

1. An oxygen-absorbing resin composition, comprising:
   a gas barrier resin (A) having an oxygen transmission rate of 500 mL·20 μm/(m²·day·atm) or less as measured at 20° C. and 65% RH;
   a thermoplastic resin (B) comprising repeating units represented by Formula (I):

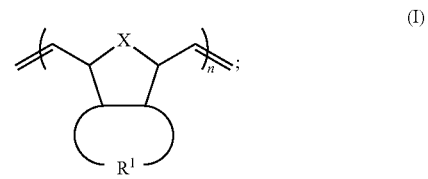

at least one type of metal salt (C) selected from the group consisting of an iron salt, a nickel salt, a copper salt, a manganese salt, and a cobalt salt; and
   a bifunctional processing stabilizer (D) that is a compound having an acrylate structure and a hindered phenol structure in a same molecule,
   wherein:
   X is a methylene group or an oxygen atom;
   $R^1$ is an alkenylene group having 3 to 12 carbon atoms; and
   n is an integer of 5 to 5000.

2. The oxygen-absorbing resin composition of claim 1, wherein the thermoplastic resin (B) comprises repeating units represented by formula (II):

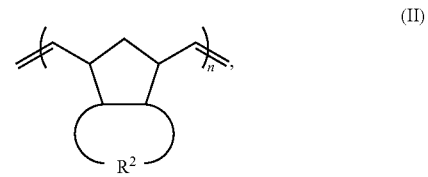

wherein: (where
   $R^2$ is an alkenylene group having 3 to 9 carbon atoms; and
   n is an integer of 5 to 5000.

3. The oxygen-absorbing resin composition of claim 1, wherein the thermoplastic resin (B) comprises repeating units represented by formula (III):

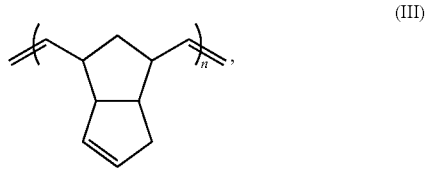

wherein n is an integer of 10 to 5000.

4. The oxygen-absorbing resin composition of claim 3, wherein the thermoplastic resin (B) is a resin obtained through ring-opening metathesis polymerization of dicyclopentadiene in the presence of a tungsten compound.

5. The oxygen-absorbing resin composition of claim 1, wherein a ratio of the bifunctional processing stabilizer (D) is 500 to 20000 ppm based on a mass of the thermoplastic resin (B).

6. The oxygen-absorbing resin composition of claim 1, wherein:
- a content of the gas barrier resin (A) is 70 to 99% by mass; and
- a content of the thermoplastic resin (B) is 30 to 1% by mass, based on a total mass of the gas barrier resin (A) and the thermoplastic resin (B).

7. The oxygen-absorbing resin composition of claim 1, wherein a ratio of the metal salt (C) is 50 to 1000 ppm in terms of metal atoms based on a total mass of the gas barrier resin (A) and the thermoplastic resin (B).

8. The oxygen-absorbing resin composition of claim 1, wherein the gas barrier resin (A) is an ethylene-vinyl alcohol copolymer at least having an ethylene unit content of 5 to 60 mol %, and having a saponification degree of 90 mol % or more.

9. The oxygen-absorbing resin composition of claim 1, further comprising a phenolic primary antioxidant (E).

10. The oxygen-absorbing resin composition of claim 9, wherein a ratio of the phenolic primary antioxidant (E) is 50 to 2000 ppm based on a mass of the thermoplastic resin (B).

11. A multilayer structure, comprising a layer made of the oxygen-absorbing resin composition of claim 1.

12. A molded product made of a multilayer structure comprising a layer made of the oxygen-absorbing resin composition of claim 1.

* * * * *

UNITED STATES PATENT AND TRADEMARK OFFICE
CERTIFICATE OF CORRECTION

PATENT NO. : 9,782,747 B2  
APPLICATION NO. : 15/324308  
DATED : October 10, 2017  
INVENTOR(S) : Wataru Hirose Page 1 of 1

It is certified that error appears in the above-identified patent and that said Letters Patent is hereby corrected as shown below:

In the Claims

Column 24, Line 15 " 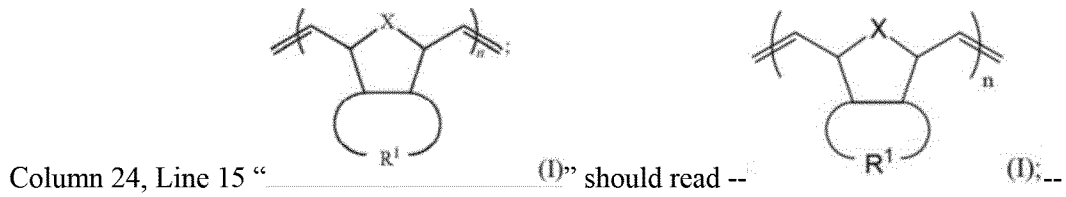 (I)" should read -- (I); --

Column 24, Line 40 " 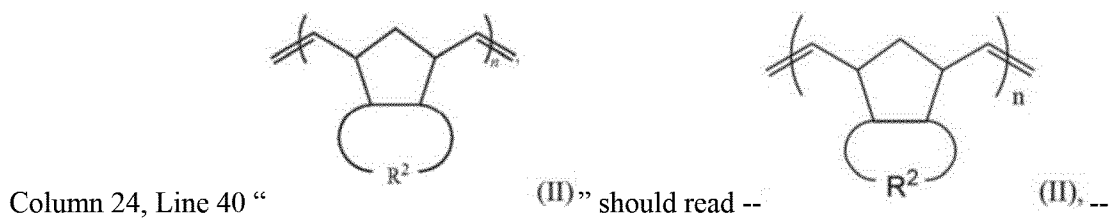 (II)" should read -- (II), --

Column 24, Line 55 " 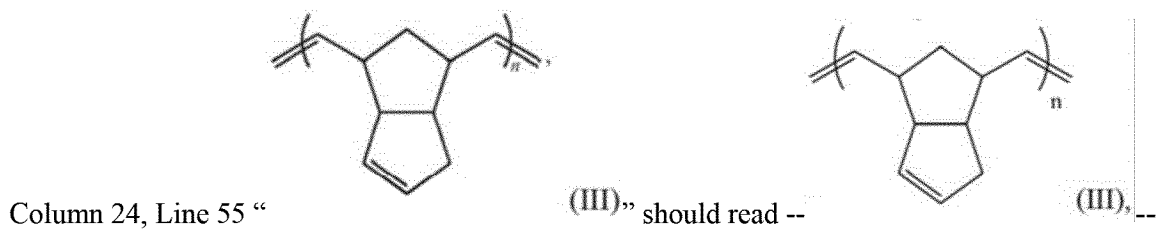 (III)" should read -- (III), --

Signed and Sealed this  
Fourteenth Day of August, 2018

Andrei Iancu  
*Director of the United States Patent and Trademark Office*